Figure 1:
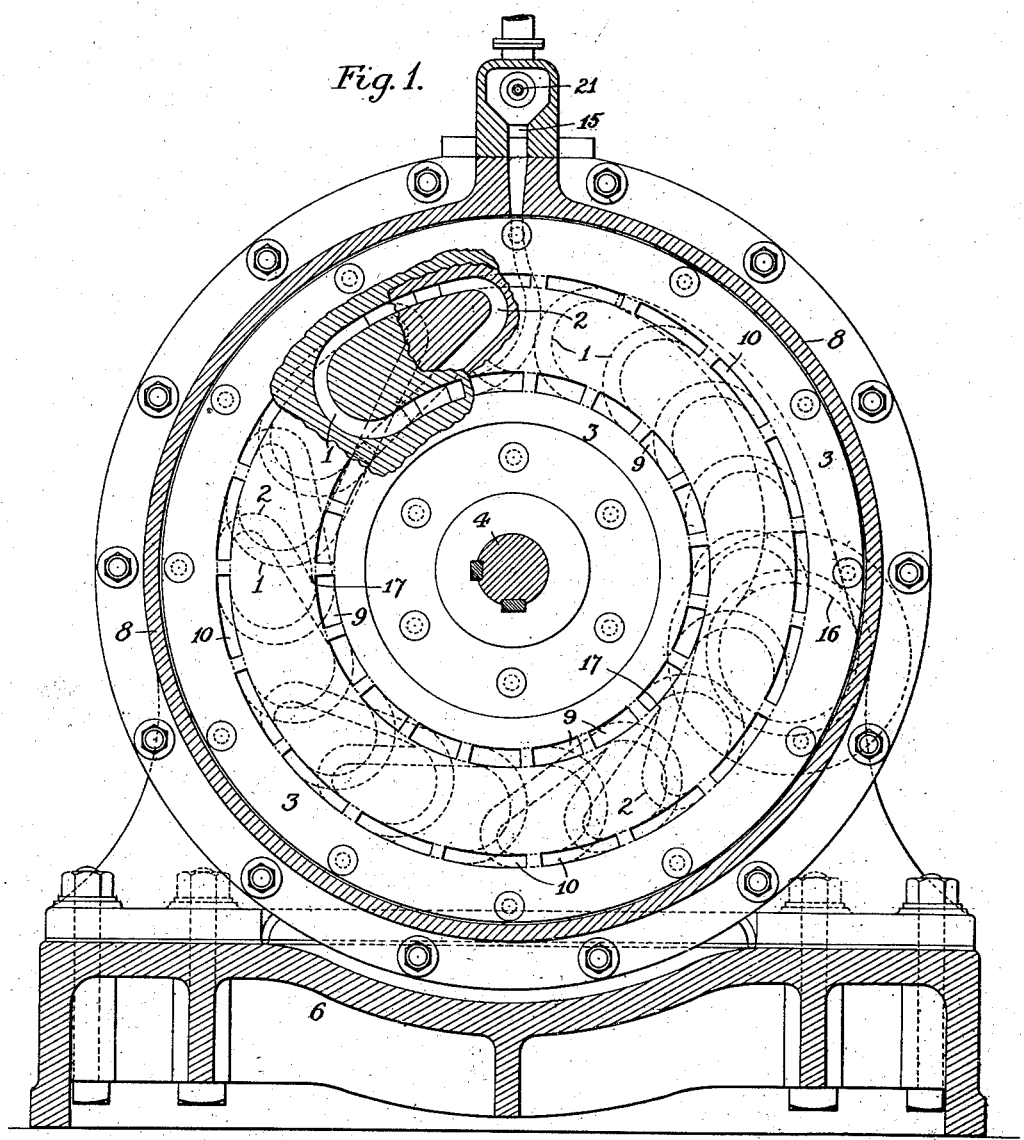

No. 742,972. PATENTED NOV. 3, 1903.
A. W. & Z. W. DAW.
TURBINE.
APPLICATION FILED APR. 21, 1903.
NO MODEL. 6 SHEETS—SHEET 1.

WITNESSES:
M. J. Dixon
W. R. Berry

INVENTORS:
Albert W. Daw,
Zacharias W. Daw,
by Henry H. Bates,
Attorney.

No. 742,972. PATENTED NOV. 3, 1903.
A. W. & Z. W. DAW.
TURBINE.
APPLICATION FILED APR. 21, 1903.
NO MODEL. 6 SHEETS—SHEET 2.

WITNESSES:
M. J. Dixon
C. R. Berry

INVENTORS:
Albert W. Daw,
Zacharias W. Daw,
by Henry H. Bates
Attorney.

No. 742,972. PATENTED NOV. 3, 1903.
A. W. & Z. W. DAW.
TURBINE.
APPLICATION FILED APR. 21, 1903.
NO MODEL. 6 SHEETS—SHEET 3.
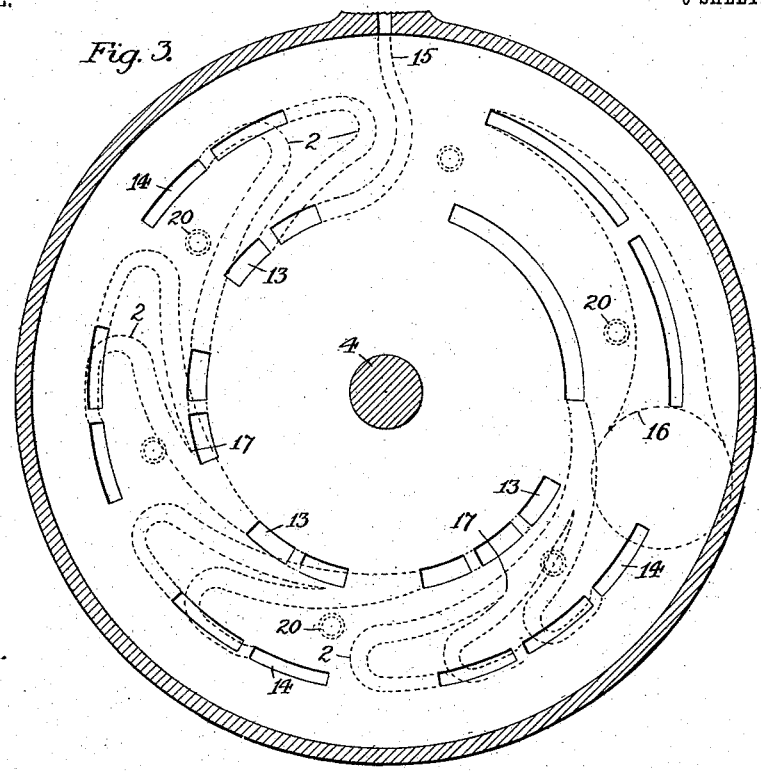
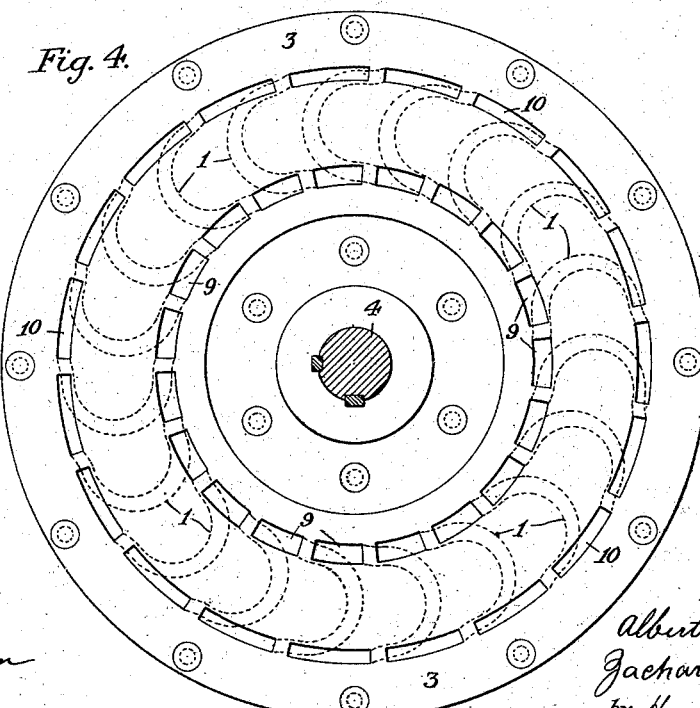

No. 742,972. PATENTED NOV. 3, 1903.
A. W. & Z. W. DAW.
TURBINE.
APPLICATION FILED APR. 21, 1903.
NO MODEL. 6 SHEETS—SHEET 4.
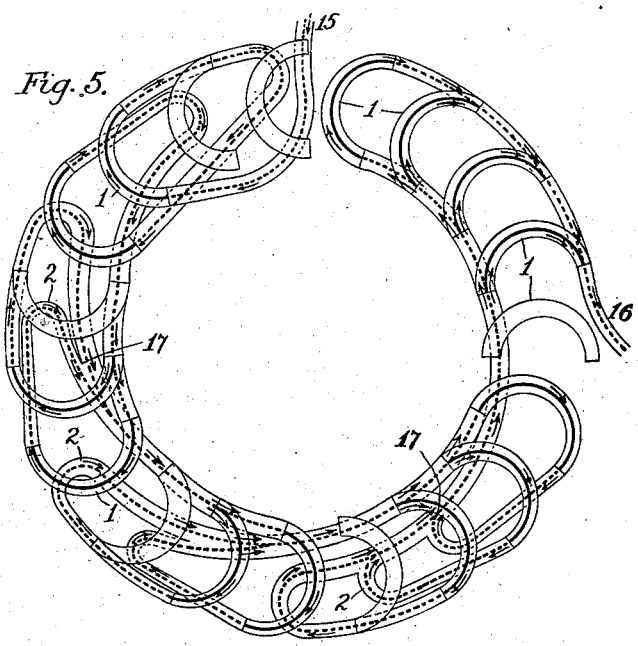
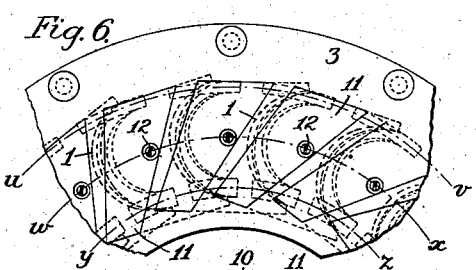
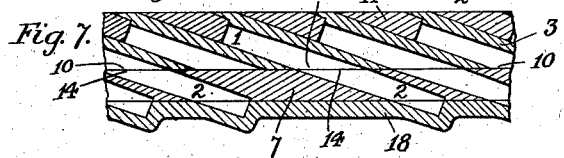
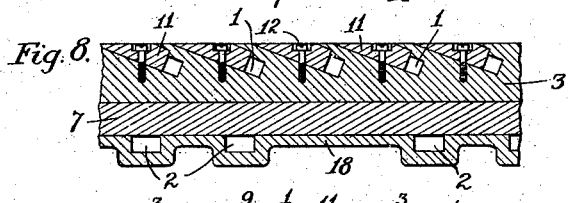
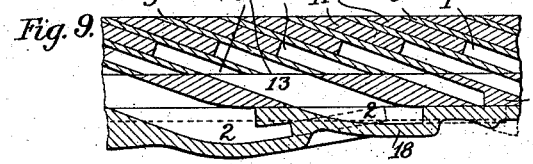
WITNESSES:
M. J. Dixon
C. R. Berry.
INVENTORS:
Albert W. Daw,
Zacharias W. Daw,
by Henry H. Bates
Attorney.

No. 742,972. PATENTED NOV. 3, 1903.
A. W. & Z. W. DAW.
TURBINE.
APPLICATION FILED APR. 21, 1903.
NO MODEL. 6 SHEETS—SHEET 5.

WITNESSES: INVENTORS:
M. T. Dixon Albert W. Daw,
W. R. Berry Zacharias W. Daw,
by Henry H. Bates,
Attorney.

No. 742,972. PATENTED NOV. 3, 1903.
A. W. & Z. W. DAW.
TURBINE.
APPLICATION FILED APR. 21, 1903.
NO MODEL. 6 SHEETS—SHEET 6.
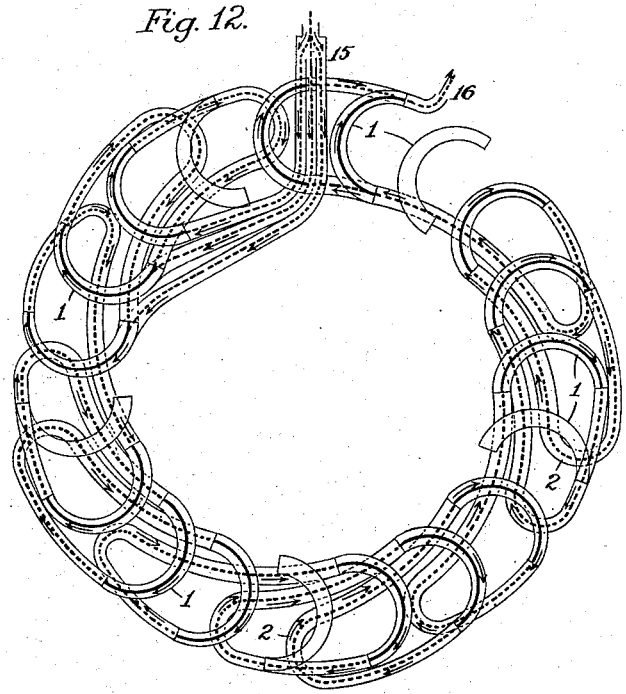
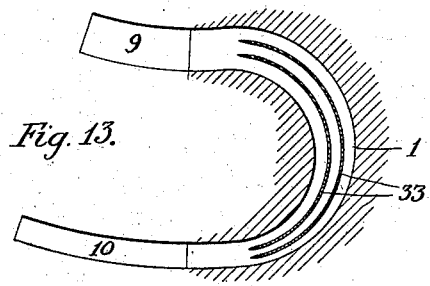
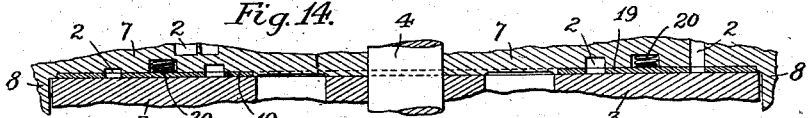

No. 742,972. Patented November 3, 1903.

UNITED STATES PATENT OFFICE.

ALBERT W. DAW AND ZACHARIAS W. DAW, OF LONDON, ENGLAND.

TURBINE.

SPECIFICATION forming part of Letters Patent No. 742,972, dated November 3, 1903.

Application filed April 21, 1903. Serial No. 153,623. (No model.)

*To all whom it may concern:*

Be it known that we, ALBERT WILLIAMS DAW and ZACHARIAS WILLIAMS DAW, subjects of the King of Great Britain, residing at Mansion House Chambers, 11 Queen Victoria street, in the city of London, England, have invented new and useful Improvements in Turbines Actuated by Steam, Compressed Air, or Gases, of which the following is a specification.

This invention relates to improvements in turbines which are set in motion by steam, compressed air, or gases, the object of the improvements being to obtain at lower speeds higher efficiency with simplicity of construction.

The improvements comprise a combination of curved buckets so arranged in the turbine as to constitute a continuous way of a helicoidal or spiral form of a more or less irregular character, as hereinafter described, such way being formed by a series of more or less link-formed or elliptical passages, (the section of which is preferably rectangular, but may be of any other form,) such continuous way forming a path for the circulation, expansion, and repeated impact of the expansive motive fluid during its passage from the supply to the exhaust. Suitable means are provided for regulating the supply of the expansive fluid to the turbine, or the link-formed or elliptical passages above referred to are so arranged that currents of very high velocity are generated in the turbine, each of such currents actuating the turbine-wheel by repeated impact as it passes through each link-formed or elliptical passage until it escapes to the exhaust.

The invention is illustrated in the accompanying drawings, in which—

Figure 2:
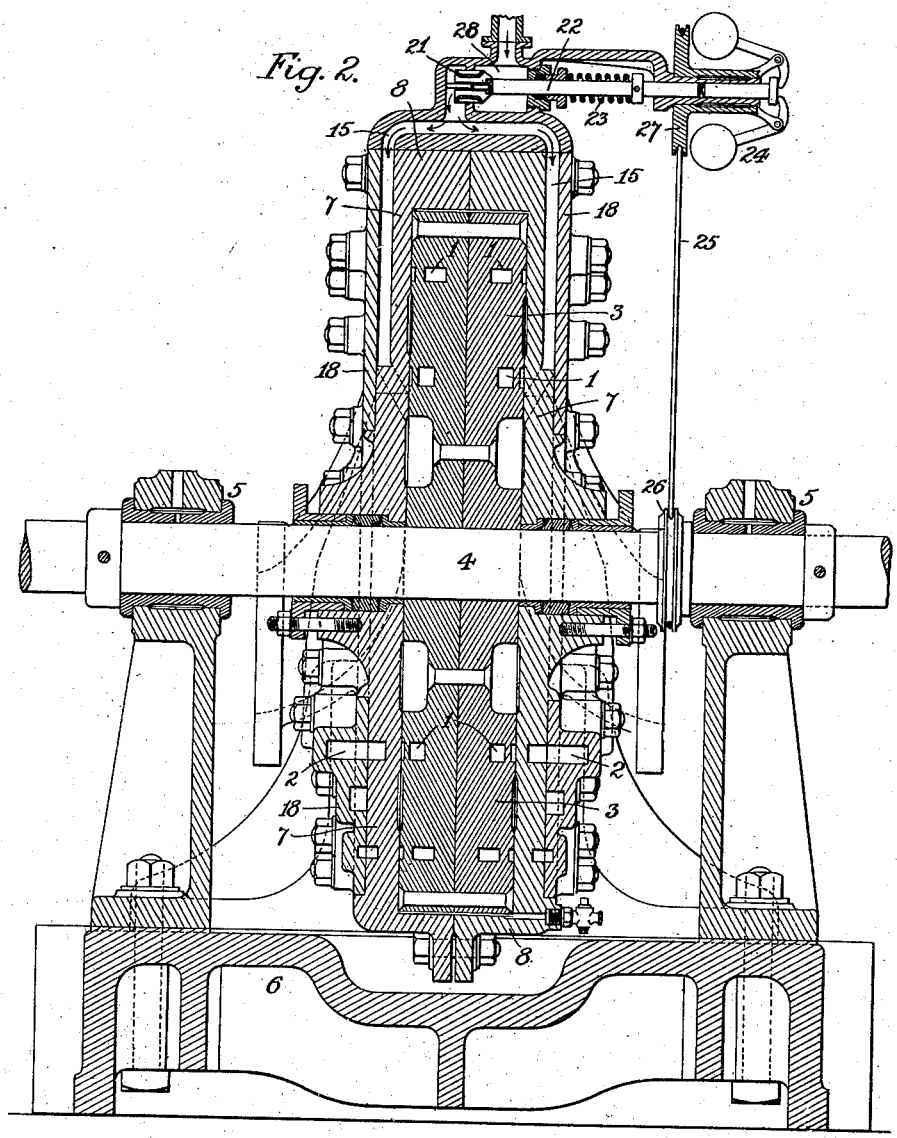
Figure 10:
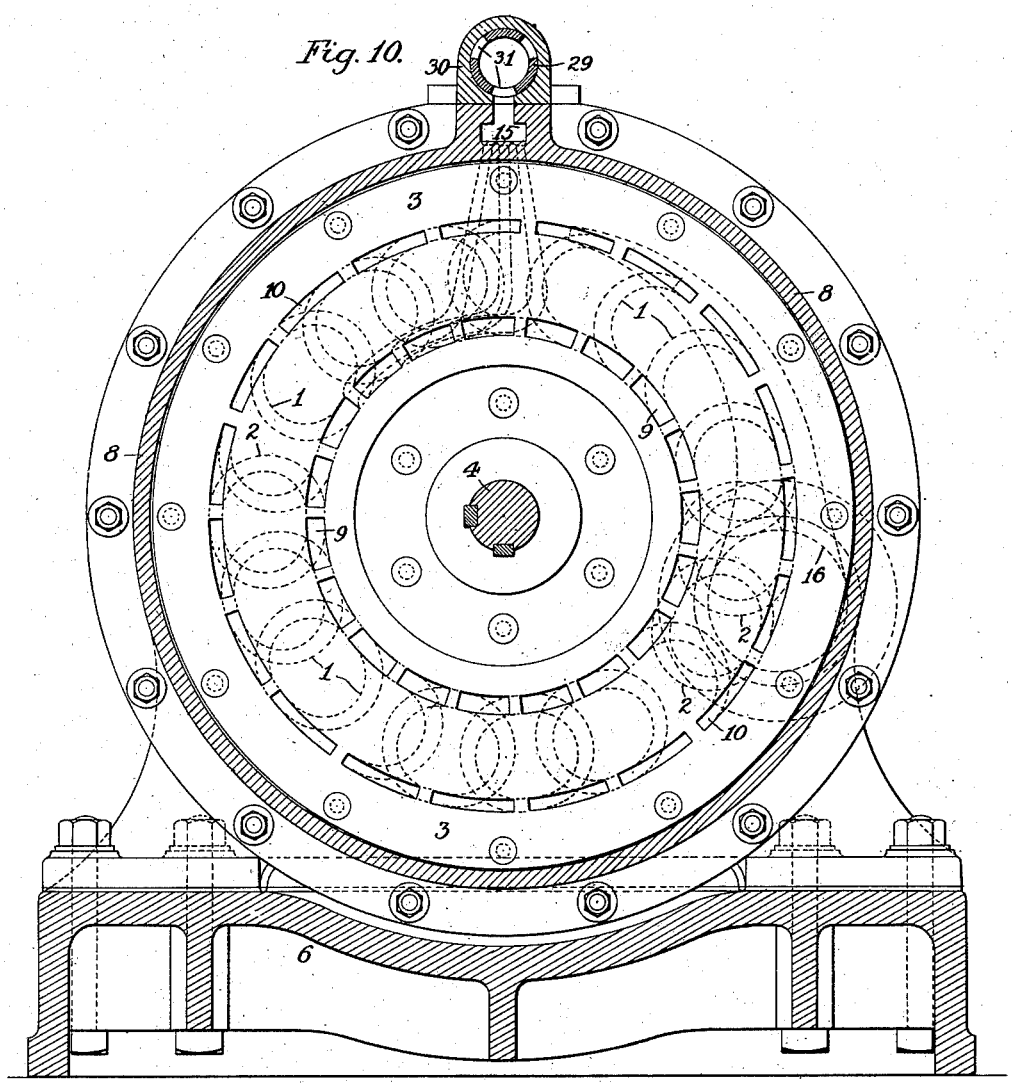
Figure 11:
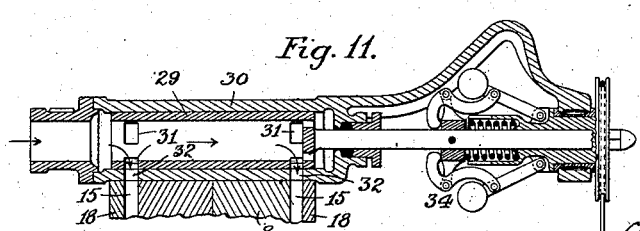

Figure 1 is a vertical sectional view of the complete turbine, and Fig. 2 a section at right angles thereto. Fig. 3 is a vertical section through the casing, showing the ports formed in the inner or working face thereof; and Fig. 4 is an elevation of the rotatory disk, showing the ports formed in its working face, the passages in this figure and in Fig. 3 being slightly distorted from the positions they actually occupy in practice in order to enable their connection with their respective ports to be clearly seen. Fig. 5 is a diagrammatic view showing the course of the motive fluid as it passes through the link-formed or elliptical passages formed in the casing and rotatory disk. Fig. 6 is a rear view of part of the rotatory disk, Fig. 7 a straightened-out section on line *u v* thereof, Fig. 8 a straightened-out section on line *w x* thereof, and Fig. 9 a straightened-out section on line *y z* thereof, these views, Figs. 6, 7, 8, and 9, illustrating a suitable method of forming the passages in such rotatory disk, Figs. 7, 8, and 9 also showing the passages formed in the casing which communicate therewith. Fig. 10 is a vertical sectional view showing a modified arrangement of the passages in the casing, and Fig. 11 is a sectional view of a suitable form of cut-off valve to be employed therewith. Fig. 12 is a diagrammatic view illustrating the course of the motive fluid in this arrangement. Fig. 13 is a partially-sectional view of one of the buckets or passages in the rotatory disk, showing a method of increasing the area of the surface thereof acted on by the motive fluid in its passage therethrough. Fig. 14 is a horizontal sectional view showing the metallic packing which may be employed between the working faces of the rotatory disk and the casing.

Referring to the drawings, it will be seen that in carrying out our invention we form the series of link-shaped or elliptical passages constituting the continuous helicoidal or spiral way above referred to of two sets of buckets 1 and 2, one of which, 1, hereinafter designated the "driving-buckets," is carried or formed in the turbine-wheel, which consists of a rotatory disk 3, fixed on a shaft or spindle 4, working in bearings 5, mounted on the base-plate 6. The other set of buckets, 2, which we will hereinafter designate as the "guide-buckets," is carried or formed in a fixed disk 7, mounted parallel to the rotatory disk 3, which latter revolves either in close contact or with little or no clearance between it and the fixed disk 7. In practice the fixed disk 7 may with advantage form part of the turbine-casing 8.

The driving-buckets 1 are arranged in close juxtaposition tangentially, or nearly so, in and around the rotatory disk 3, near its periphery, at an angle of about twenty degrees with the side of the disk, as shown in Figs. 7, 8, and 9. The two mouths 9 10 of each driving-bucket 1 therefore form an oblique angle to the passage in the bucket, so as to conform with the side of the disk, one of them, 9, being placed nearer the center of the disk than the other, 10, on the same disk-face. A similar series of link-shaped or elliptical buckets 1 may be arranged on the other side of the rotatory disk 3, or preferably, as shown in Fig. 2, the disk 3 is formed in two parts, which may be secured together by rivets or in any other suitable manner. In this case each of such parts is provided with a series of buckets 1, each series coacting, as hereinafter described, with a series of buckets arranged in the fixed disks 7, mounted to operate in connection therewith, this arrangement being adopted to balance the side thrust due to the angle of the buckets 1 to the side of the disk 3. The passages which constitute such buckets 1 may be formed in the rotatory disk 3 in any suitable manner, that shown in Figs. 6, 7, 8, and 9 consisting in casting such disk with recesses right through it at an angle of approximately twenty degrees with the side thereof, such recesses being substantially U-shaped, the arms thereof leading to the working face of the rotatory disk 3 and so ending, respectively, in the two mouths 9 10 of each bucket. From the outer edges of the two arms of the U-shaped opening the recess is continued right through to the back of the disk, and into this recess a concave-ended piece 11 is inserted and secured by screw 12 or otherwise, the concave end of such inserted piece constituting the completion of the outer edge of the U-shaped opening and closing the recess from that point to the back of the disk 3, thus leaving a passage leading direct from one mouth, 9, to the other, 10, of the bucket 1.

The guide-buckets 2 are more or less similar in form and similarly placed to those in the rotatory disk 3 and may be formed by recesses made partly in the fixed disk 7, forming part of the casing 8, and partly in a plate or disk 18, secured outside thereof. They are arranged in the reverse position to the driving-buckets, and instead of their two mouths 13 14 opening in substantially the same radial line from the center of the disk, as in the case of the buckets 1, each of the buckets 2 in the fixed disks 7 is, as shown more particularly in Fig. 3, formed with the necessary side bend and extension of one of its arms, so that its mouth 13 near the center of the disk shall lie in a radial line a suitable distance in advance of its other outer mouth 14, the object of this arrangement being that the bucket 2 on receiving a supply of the motive fluid from one of the buckets 1 of the rotatory disk 3 shall lead same to the following bucket 1 in the latter (except as provided for as hereinafter described) or to two or more of same, the guide-buckets 2 in the fixed disks 7 being preferably so arranged with regard to the driving-buckets 1 in the rotatory disk 3 that their area increases in any desired ratio from the supply 15 to the exhaust 16, so that said guide-buckets 2 will in succession correspond to any given increasing number of driving-buckets 1, which latter are arranged uniformly round the rotatory disk, so that the motive fluid will be caused to act expansively as it passes through such increasing passages.

As the way or path for the fluid increases in area (owing to one port of the guide-bucket communicating with more driving-buckets than the other port does) in order to cause such motive fluid to have to travel approximately the same distance in its journey from one set of driving-buckets 1 to the next the guide-bucket passages 2 are constructed so as to equalize such length of travel, a suitable method of effecting this being to form separate passages 2, with inlet-mouths 13 leading from the outlet-mouths 10 of each driving-bucket 1 of a series, such passages 2 merging into one at the points 17 (shown best in Fig. 3) and thence conveying the motive fluid to the inlet-mouths 9 of the next series of driving-buckets 1.

The mouths 9 10 of the driving-buckets 1 and those, 13 14, of the guide-buckets 2 lie in two concentric circles on the working faces of the rotatory disks 3 and fixed disks 7, respectively, and cover each other continuously during the rotation of the rotatory disk, except that at suitable intervals around the fixed disks 7 the guide-buckets 2 are arranged, as shown in Fig. 3, to lead the motive fluid so as to miss one or more of the buckets 1 in the rotatory disk 3, thereby providing a barrier to prevent a zigzag flow of such motive fluid to the exhaust through the guide and driving buckets at the plane of contact of the rotatory and fixed disks without effective action on the driving-buckets.

The supply-port 15 and exhaust-port 16 are so arranged in the fixed disks 7 that the motive fluid must travel right through the series of link-formed or elliptical passages constituted by the driving-buckets 1 and guide-buckets 2 before reaching the exhaust 16, this being attained by placing such exhaust only a short distance away from and behind the supply-port 15, a sufficient barrier being provided between the two, and, if necessary, (when the turbine is run at very low speeds,) metallic packing used to prevent loss by leakage. Such metallic packing may, as shown in Fig. 14, consist, essentially, of a plate 19, of metal, pressed out of a recess in the fixed disk 7 against the surface of the rotating disk 3, or vice versa, by springs 20, a suitable number of the latter being provided, as shown in dotted lines in Fig. 3. In this arrangement the passages in the fixed disk 7 will be extended through the plate 19, the openings in which will therefore constitute the mouths 13 14 of such passages.

The supply of the motive fluid to the port 15, by which it enters the turbine, is controlled by a valve such as that shown at 21 in Figs. 1 and 2. Such valve, which, as will be seen, permits of a continuous supply of the motive fluid, is mounted on the end of a spindle 22, capable of movement in relation to the valve-seat, and acted upon by a spring 23, so as to normally keep the valve 21 fully open. A governor 24 is suitably mounted in relation to the end of the spindle 22 and operated by means of a cord or belt 25, passing over pulleys 26 and 27, mounted, respectively, on the turbine-shaft 4 and on the shaft on which the governor is carried, so that should the speed become excessive or the load on the turbine be lightened the action of the governor will be to move the valve 21 toward its seat, and thus reduce the supply. Any other suitable form of valve and governor may, however, be employed for the purpose.

For starting and working the machine an ordinary valve (not shown) may be used to open the supply to the valve-box 28, in which the regulating-valve 21, above described, operates.

The action of the steam or other motive fluid delivered to the turbine through the ports 15 is as follows: Immediately on entering such passage, which leads direct to the first bucket, such motive fluid commences to expand, and such expansion is continued in the passages and buckets until the motive fluid attains the same pressure as in the exhaust. A current of very high velocity is thereby produced which gives impact in each bucket which it traverses, losing in so doing a portion of its velocity, dependent on the speed of revolution of the rotatory disk, the remaining velocity (which may be increased by continued expansion) carrying it to the covering guide bucket or buckets of the fixed disks, in which it is deflected and guided back again to the covering bucket or buckets of the rotatory disk. In passing again through a bucket or buckets of the rotatory disk it suffers the same loss of velocity as before, and such action and reaction with the return of the current from the fixed to the rotatory disk are continued throughout the whole series of buckets (with the exception of those cut out for the purpose hereinbefore described) until the pressure is reduced to that of the exhaust, the expansion continuing during the whole time and transmitting the whole or the greater part of its *vis viva* to the turbine-wheel.

The operation of the respective passages will be fully understood by reference to the diagrammatic view Fig. 5, in which the fine lines represent the passages, and the heavy central line on such passages shows the way or path of travel of the motive fluid, being a full line where it passes through the buckets 1 in the rotatory disk and dotted where it passes through the connecting-passages 2 in the casing, while the passages in the rotatory disk through which no lines pass are those which are cut out in the particular position represented in the diagram. From this diagrammatic view it will be seen that the path of travel of the current of motive fluid entering at supply-port 15 is, briefly, as follows: through the first driving-bucket; the first guide-bucket 2; the second driving-bucket; the second guide-bucket, which conducts it to the fourth and fifth driving-buckets; the third and fourth guide-buckets, which unite and convey it to the seventh and eighth driving-buckets; the fifth and sixth guide-buckets, which unite and convey it to the tenth, eleventh, and twelfth driving-buckets, and the seventh, eighth, and ninth guide-buckets, which unite and convey it to the fourteenth, fifteenth, sixteenth, and seventeenth driving-buckets, from which it passes to the exhaust 16. It will thus be seen that the third, sixth, ninth, thirteenth, eighteenth, and nineteenth buckets are cut out from the supply in the position represented. As the rotatory disk revolves, however, they will be brought into action and others cut out as they arrive at the positions occupied in the diagram by those referred to.

Instead of arranging the turbine-buckets so as to be open to a continuous supply of the motive fluid we may employ an intermittent supply, an arrangement for this purpose being illustrated in Figs. 10 and 11 and also (diagrammatically) in Fig. 12 of the drawings. In this case it will be seen that such supply is rendered intermittent by means of a revolving cylindrical piston-valve 29, working in a cylinder 30, to which the motive fluid is supplied. Such piston-valve 29 is also capable of a rectilinear movement under the control of a governor 34, which receives its motion from the main shaft 4 of the turbine. The piston-valve 29 is, as shown in Fig. 11, made hollow to allow the motive fluid to enter therein and pass through port-holes 31, corresponding with others, 32, in the valve-cylinder 30, from which passages 15 lead to the turbine-buckets.

During each revolution or part of a revolution of the piston-valve 29 the motive fluid will be delivered to the turbine while the port-holes 32 in the valve-cylinder 30 are in communication with the port-holes 31 in the piston-valve 29, the amount of supply of the motive fluid being regulated by the governor 34, which by the rectilinear movement it imparts to the piston-valve (consequent on variations in the speed of or load on the turbine) will vary the extent of opening between the ports 31 and 32.

For starting and working the machine an ordinary valve may be used to open the supply-port 15 (which in this case may be divided so as to supply two, three, or more driving-buckets 1 at a time) to the motive fluid independent of the cut-off piston-valve 29, or this might be effected mechanically by employing any suitable means, such as a pawl and ratchet-wheel, for revolving such valve 29 in relation to the ports 32. In operation such valve 29 is driven at any required speed, preferably from the turbine-spindle 4, by suitable belt, cog-wheel, friction, chain, or other gearing, so as to deliver the required quantity of motive fluid to the machine for developing the fullest efficiency thereof, the rotary speed of the piston-valve 29 and also the size of the port-holes 31 therein being adjusted according to the time required for the proper expansion of each delivery of the motive fluid throughout the buckets of the turbine.

The driving-buckets 1 in the rotatory disk 3 are arranged similarly to those in the preceding arrangement; but none of the guide-buckets 2 in the fixed disks 7 are in this case branched so as to conduct the motive fluid to more than one of the driving-buckets. As will be seen on reference to Fig. 10 and the diagrammatic view Fig. 12, each guide-bucket 2 on receiving its supply of motive fluid from one of the driving-buckets 1 conducts same to the following driving-buckets except where, as in the previous arrangement, such following driving bucket or buckets is or are to be cut out for the purpose of preventing a zigzag flow of the motive fluid direct to the exhaust, in which case the motive fluid is led to the next effective driving-bucket.

Owing to the cut-off at each revolution or part of a revolution, the motive fluid is free to expand to its fullest extent in the turbine, and therefore to attain a very high velocity, which is gradually reduced in the buckets by the transmission of its energy to the turbine-wheel. Such reduction of velocity necessitates the use of a cut-off valve, as described, to obtain the highest efficiency, as with the construction illustrated in Fig. 10 a continuous supply of the motive fluid would check expansion, thereby preventing the generation of currents of the highest velocity, with consequent reduction of the efficiency of the motor. This is provided for in the previous arrangement by causing the motive fluid as it expands to act on an increasing number of driving-buckets, so that the continuous supply there used is not open to the objections that would be present were it employed in the arrangement illustrated in Fig. 10.

The diagrammatic view Fig. 12 will enable the operation of each jet or stream of motive fluid delivered by the cut-off piston 29 to be readily understood. In this figure, as in Fig. 5, the fine lines indicate the passages, the heavy central line thereon showing the path of travel of the motive fluid in a full line through the driving-buckets and in a dotted line through the guide-buckets or connecting-passages, while the passages from which such line is omitted are the driving-buckets, which are cut out in the particular position indicated. From this view it will be seen that the motive fluid is, on entering through branched supply-passage 15, divided into three parts, which pass, respectively, to the first, second, and third driving-buckets 1, from each of which it passes to a guide-bucket 2 and thence to the respectively-following driving-bucket, and so on right around the turbine, with the exception that the fourth, eighth, twelfth, sixteenth, and nineteenth driving-buckets are cut out for the purpose hereinbefore described. From the seventeenth and eighteenth driving-buckets the motive fluid passes to the exhaust 16.

In both of the arrangements above described we have shown nineteen driving-buckets 1 in the rotatory disk 3; but it will be readily understood that the number of same, as well as the diameter of such disk, depend upon the speed required of the turbine, as such number of buckets and diameter of disk must be proportioned to the speed and other conditions in order to attain the highest efficiency.

In order to increase the amount of surface on which the motive fluid can act in the driving-buckets 1 in the rotatory disk 3, such buckets may, as shown in Fig. 13, be provided with one or more partitions 33.

Instead of one rotatory disk 3 two or more may be run on the same spindle or shaft 4, and the exhaust may be carried to a condenser to obtain the highest possible efficiency in air, gas, or steam consumption.

What we claim as our invention, and desire to secure by Letters Patent, is—

1. A turbine composed of a rotatory disk and a fixed disk with plane faces in juxtaposition, curved passages forming buckets in the rotatory disk terminating in its plane face, curved passages in the fixed disk terminating in its plane face, one end of each of said fixed passages being in line of communication with one end of each of said rotatory passages, and the other end of each of said fixed passages being in line of communication with the other ends respectively of said rotatory passages, and of a span to avoid connection simultaneously with the opposite ends of the same rotatory passage.

2. A turbine composed of a rotatory disk and a fixed disk with plane faces in juxtaposition, curved inclined passages forming buckets in the rotatory disk terminating in its plane face, curved passages in the fixed disk terminating in its plane face, one end of each of said fixed passages being in line of communication with one end of each of said rotatory passages, and the other end of each of said fixed passages being in line of communication with the other ends respectively of each of said rotatory passages, of a span to avoid connection simultaneously with the opposite ends of the same rotatory passage, and means to supply steam under pressure to the initial fixed passage or passages and to exhaust steam from the terminal passage.

3. A turbine composed of a rotatory disk and a fixed disk with plane faces in juxtaposition, curved inclined bucket-passages in the rotatory disk, the respective ends terminating in the plane face in two circles of different radii, curved passages in the fixed disk, the respective ends terminating in the plane face in circles opposite to those of the rotatory-disk passages, and of a span to avoid bringing the respective ends of the fixed passages opposite to the connecting ends of the same rotatory passage simultaneously.

4. A turbine composed of a rotatory disk and a fixed disk with plane faces in juxtaposition, curved bucket-passages in the rotatory disk all inclined at a similar angle to the plane face, their respective ends terminating in the plane face tangentially to the path of travel in two circles of different radii, curved inclined passages in the fixed disk having their respective ends terminating in the plane face tangentially to the line of travel and in circles opposite to those of the terminals of the rotatory-disk passages, of a span to avoid communication of any fixed passage with both ends of the same rotatory passage simultaneously.

5. A turbine composed of a rotatory disk and a fixed disk with plane faces in juxtaposition, curved inclined passages at equal distances apart, forming buckets in the rotatory disk terminating tangentially to the line of travel in its plane face in two circles of different radii, curved passages in the fixed disk terminating in its plane face in two circles opposite to the lines of travel of the terminals of the rotatory passages, said fixed passages being arranged with intervening gaps or blank spaces, substantially as and for the purpose specified.

6. A turbine composed of a rotatory disk and a fixed disk with plane faces in juxtaposition, curved inclined equidistant passages forming buckets in the rotatory disk terminating in its plane face, curved passages in the fixed disk terminating in its plane face, said terminals being respectively opposite to the lines of travel of the terminals of the passages of the rotatory disk, to be in successive communication therewith, the terminals on the discharge ends of said fixed passages being in simultaneous communication with a greater number of rotatory terminals than the terminals on the inlet end of said fixed passages.

7. A turbine composed of a rotatory disk and a fixed disk with plane faces in juxtaposition, curved inclined passages forming buckets in the rotatory disk terminating in its plane face, curved passages in the fixed disk terminating in its plane face, one end of each of said fixed passages being in line of communication with one end of each of said rotatory passages, and the other end of each of said fixed passages being in line of communication with the other ends respectively of each of said rotatory passages, of a span to avoid connection simultaneously with the opposite ends of the same rotatory passage, and means to supply steam intermittently to the initial fixed passage or passages and to exhaust steam from the terminal passage.

8. A turbine composed of a rotatory disk with passages forming buckets in its working face, and a fixed disk also with passages forming buckets, the ends of each bucket of both sets of buckets or passages opening out on the contact-surface of such disks and one end situated at a different distance from the center of rotation than the other end, while one end of the fixed-disk passages communicates with a different rotatory-disk bucket or buckets to that with which the other end corresponds, substantially as specified.

9. A turbine composed of a rotatory disk with passages forming buckets in its working face, and a fixed disk also with passages forming buckets, the outer end of the latter passages communicating with a greater number of the buckets of the rotatory disk than the inlet end corresponds with, substantially as specified.

In testimony whereof we have signed our names to this specification in the presence of two subscribing witnesses.

A. W. DAW.
ZACH. W. DAW.

Witnesses:
W. J. FERRY,
R. H. MECKIFFE.